J. A. DEYOUNG.
LEVER LOCKING DEVICE.
APPLICATION FILED AUG. 22, 1913.
1,127,203.
Patented Feb. 2, 1915.
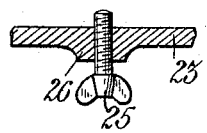
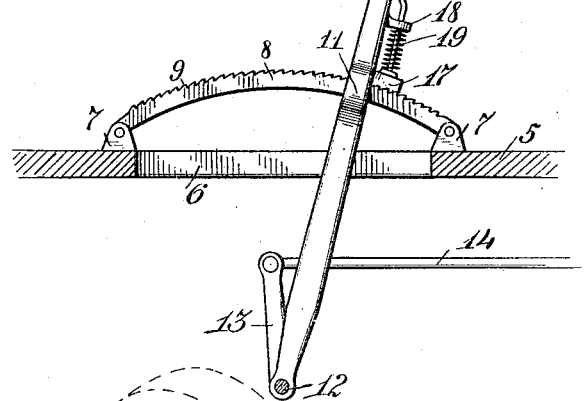
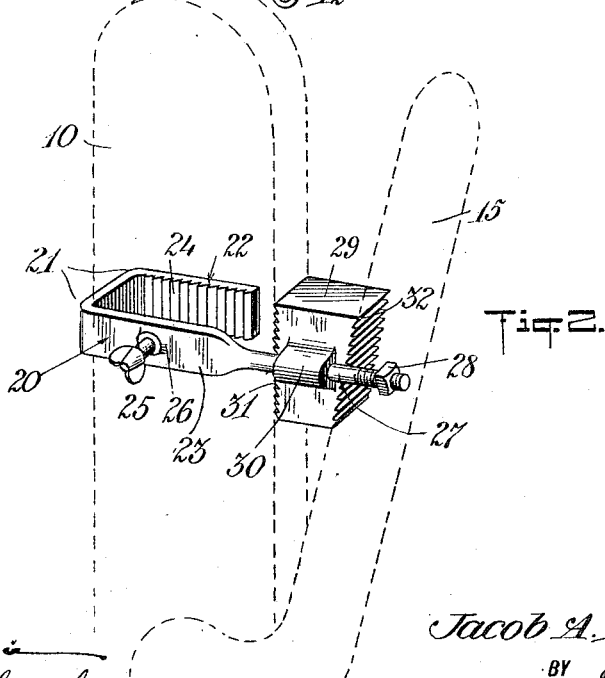
WITNESSES
INVENTOR
Jacob A. DeYoung
BY
ATTORNEYS

UNITED STATES PATENT OFFICE.

JACOB ANDREW DEYOUNG, OF WEST NEW YORK, NEW JERSEY.

LEVER-LOCKING DEVICE.

1,127,203.  Specification of Letters Patent.  Patented Feb. 2, 1915.

Application filed August 22, 1913. Serial No. 786,093.

*To all whom it may concern:*

Be it known that I, JACOB A. DEYOUNG, a citizen of the United States, and a resident of West New York, in the county of Hudson and State of New Jersey, have invented a new and Improved Lever-Locking Device, of which the following is a full, clear, and exact description.

This invention relates to an improved lever locking device and has special application to a throw lever provided with a latching mechanism which is coöperative with a notched segment, the device being designed to be removably attached to the lever and to fit between the lever and the grip of the latch to hold the engaging portion of the latter in positive or binding engagement with the notched segment.

Another object of the invention is to provide an improved device of the above character which is designed for attachment to levers of various designs and sizes but which is specifically devised to prevent the reverse lever on a locomotive from shifting or jumping down in the corner or to the end of the segment when the teeth of the latch and segment have become worn, thus preventing accidental shifting of the lever on the segment or quadrant and preventing the engineer's legs from being broken, as well as damage to machinery which would otherwise be caused.

With the above and other objects in view, the invention resides more particularly in the peculiar combination and arrangement of parts which will be illustrated as a preferred embodiment in the accompanying drawings and described in the specification.

Reference is to be had to the accompanying drawings forming a part of this specification, in which similar characters of reference indicate corresponding parts in all the views, and in which—

Figure 1 is a side elevation of a reverse lever with its supporting parts in section, the lever having the improved locking device attached thereto for insuring binding engagement of the latch lock or bolt with the segment; Fig. 2 is a perspective view of the improved locking device enlarged with respect to Fig. 1, the adjacent portions of the lever and latch handle or grip being shown in dotted lines; and Fig. 3 is an enlarged sectional view through the locking device to show the set screw for securing the same to the lever.

In the drawings, the numeral 5 indicates the floor or supporting projection of the cab of a locomotive or other vehicle, the same having an elongated slot 6 therethrough, adjacent to each end of which a post 7 is mounted on the floor for the attachment of a notched segment or toothed quadrant 8, the teeth 9 being disposed relatively close to each other. A reverse or throw lever 10 is provided with a projection 11 slidably engaging the segment 8 and said lever depends through the slot 6 where it is mounted upon a pivot or shaft 12 to which an arm 13 is secured and designed, by reason of a connecting rod 14, to control the throttle valve or reversing mechanism in the usual manner. It is to be understood, however, that the rod may be connected to any other shiftable part with which a throw lever of the type described may be employed.

Pivoted to the handle of the throw lever 10 is an angular latch grip or handle 15, which, by means of a rod 16 is connected to a bolt or toothed block 17, the said rod operating through guide eyes 18, between the lowermost of which and the block 17 an expansible spring 19 is mounted to hold the block in positive engagement with the segment. It very often happens that the teeth of the segment and the block become worn so that the spring, although of the proper tension, will not hold the block in binding engagement with the segment sufficient to prevent shifting of the lever, and the resulting effects of this are well known to those familiar with such devices. It is therefore the purpose of this invention to obviate such objections, and for this purpose the improved locking device is provided. This locking device consists essentially in a clamp 20 in the form of a strip of metal bent at right angles at spaced points, as shown at 21, to provide end and spaced jaws 22 and 23, respectively. The jaw 22 is provided with teeth 24 at its inner side, preferably extending vertically, while the jaw 23 has a set screw 25 operating therethrough. This jaw at the point where the set screw operates therethrough is provided with a projection or boss 26 so that the screw will be positively guided for clamping the device in the handle of the lever, as shown in Figs. 1 and 2 of the drawings, while the teeth 24 will prevent the device from slipping out of its adjusted position. The legs of the clamp are of different lengths so that the jaw 23 terminates in a circular portion 27 having an enlarged end preferably produced by a nut 28 threaded thereon.

A wedge-shaped block 29 is designed to fit between the handle of the lever 10 and the grip or handle 15 of the latch, and for this purpose is provided with an apertured extension or ear 30 by which it is pivotally supported on the portion 27 whereby it is permitted to be turned between the lever handle and the latch grip when desired to hold the block 17 in positive locking position to prevent shifting of the throw lever. This is effected by holding the grip or handle 15 spaced from the gripping portion of the throw lever and is clearly shown in Fig. 1 of the drawings. One side of the block is provided with teeth 31 and is at right angles to the end thereof and is designed to engage the adjacent edge of the lever 10, while the opposite side of the block is provided with the teeth 32 and is disposed in an angular direction with respect to the other side and ends, whereby the block tapers from its top to its bottom and whereby the teeth 31 and 32, by engaging the adjacent edges of the lever and latch will be held from outward displacement and thus prevent shifting of the reverse levers.

It is obvious that a device of this character may be conveniently attached to and removed from the lever so that it is essentially a portable device capable of being removed by the fireman or engineer and attached to a lever of a particular locomotive to which it is assigned, the pivotal mounting of the block 29 permitting it to be thrown into and out of position conveniently, as desired.

Having thus described my invention, what I claim as new and desire to secure by Letters Patent is:—

1. A locking device for levers having a latching mechanism including a clamp adapted to engage the lever and to be vertically adjusted thereon, said clamp having an extension and a weighted block loosely pivoted on the extension for operation into and out of the space between the lever and the latching mechanism, as and for the purpose described.

2. In a locking device for a reverse lever provided with a latching mechanism including a handle pivoted to the lever and a bolt coöperative with a notched segment, a clamp including spaced jaws to engage the lever, a set screw operating through one jaw to secure the clamp to the lever, one jaw being provided with an extension, and a wedge-shaped block carried by the extension to fit between the lever and handle to hold the same spaced apart.

3. In a locking device for a reverse lever provided with a latching mechanism including a handle pivoted to the lever and a bolt coöperative with a notched segment, a clamp including spaced jaws to engage the lever, a set screw operating through one jaw to secure the clamp to the lever, a circular extension formed with one jaw, a block pivoted to said extension and designed to move into and out of the space between the lever and handle, and an enlargement to prevent displacement of the block.

4. In a locking device for a reverse lever provided with a latching mechanism including a handle pivoted to the lever and a bolt coöperative with a notched segment, a clamp including spaced jaws to engage the lever, a set screw operating through one jaw to secure the clamp to the lever, a circular extension formed with one jaw, a block pivoted to said extension and designed to move into and out of the space between the lever and handle, one of said jaws being roughened, the opposed engaging faces of the block being also roughened, and a nut threaded on said circular extension to removably secure the block thereto.

5. A locking device for levers having a latching mechanism with a grip adjacent to the lever for operating the latching mechanism, a one-piece clamp engageable with the gripping portion of the lever, said clamp comprising spaced jaws one of which has an extension projecting toward the grip, and a wedge block carried by the extension to fit between the lever and the grip to hold the same spaced apart and the latching mechanism operative, whereby shifting of the lever is prevented, disengagement of the block from between the lever and grip permitting operation of the latter to release the latching mechanism whereby the lever may be shifted.

In testimony whereof I have signed my name to this specification in the presence of two subscribing witnesses.

JACOB ANDREW DEYOUNG.

Witnesses:
W. J. HYDE,
M. L. McKEE.

Copies of this patent may be obtained for five cents each, by addressing the "Commissioner of Patents, Washington, D. C."